United States Patent [19] [11] 4,068,887
Babbs [45] Jan. 17, 1978

[54] SEAT MOUNTINGS

[75] Inventor: Frederick William Babbs, Sherwood, England

[73] Assignee: Cox of Watford Limited, England

[21] Appl. No.: 605,936

[22] Filed: Aug. 19, 1975

[30] Foreign Application Priority Data

Aug. 22, 1974 United Kingdom ............... 37013/74

[51] Int. Cl.² ............................................. B60R 21/10
[52] U.S. Cl. .................................... 297/216; 248/393; 297/386
[58] Field of Search ....................... 297/216, 386, 385; 296/63, 65 R; 248/393, 424, 430; 308/3.8, 6 R; 312/340, 339, 341

[56] References Cited

U.S. PATENT DOCUMENTS

| 1,963,220 | 1/1934 | Anderson | 312/339 |
| 3,157,441 | 11/1964 | Pickles | 308/6 R |
| 3,157,441 | 11/1964 | Pickles | 248/430 X |
| 3,288,422 | 11/1966 | Krause | 297/385 X |
| 3,328,106 | 6/1967 | Mullin | 312/341 R |
| 3,429,613 | 2/1969 | Rice | 297/386 |
| 3,524,677 | 8/1970 | Louton, Jr. | 248/430 X |
| 3,620,495 | 11/1971 | Korab | 248/430 |
| 3,685,872 | 8/1972 | Babbs | 248/430 |
| 3,727,977 | 4/1973 | Gmeiner | 297/385 |
| 3,746,393 | 7/1973 | Kölle et al. | 297/385 |
| 3,845,987 | 11/1974 | Bashford | 248/393 |
| 3,917,342 | 11/1975 | Furtura | 297/385 |
| 3,944,302 | 3/1976 | Fourrey | 308/3.8 X |

Primary Examiner—James T. McCall
Attorney, Agent, or Firm—Watson, Cole, Grindle & Watson

[57] ABSTRACT

This invention is directed to a fore-and-aft adjustable seat mounting for a vehicle comprising a pair of relatively slidable channels which have interlocking flanges capable of deformation to absorb loads, whereby one end of a seat belt can be fixed either to the movable channel or to the seat fastened to that channel and the mounting will be capable of absorbing the substantial loads that may be experienced in an accident.

14 Claims, 7 Drawing Figures

SEAT MOUNTINGS

This invention relates to seat mountings having relatively slidable members enabling the seat to be adjustable in a fore and aft direction, and one object of the invention is to provide such a mounting which is very safe for the passenger using such a seat in a vehicle.

According to the present invention, the seat mounting has relatively slidable members, one of which is arranged for being secured to a vehicle, and the other of which is arranged for being secured to the seat, the latter including a fastening device for attachment to one end of a seat belt.

Whereas previously it has been usual to fasten the ends of a seat belt in a motorcar, for example, to two points on the body of the car, it has now been found desirable where a seat is adjustable in relation to the body of the car to fasten at least one end of the seat belt to the adjustable component of the mounting or possibly to the seat itself, so that the arrangement of the seat belt is not substantially disturbed by adjustment of the seat in relation to the body of the car.

Where the slidable members are elongate fore-and-aft channels, one within the other, then a seat belt-retaining fitting can be bolted, rivetted, welded or otherwise fastened to a part, preferably the rear end of the slide, that is to be fixed to the seat, although it is equally possible to fasten that end of the seat belt to the seat itself.

With such an arrangement, the load applied between the relatively slidable members in the case of a head-on collision, for example, is greater than it would be if the seat belt were fastened to the body of the car because the inertia forces on the occupant will be transferred to the seat mounting, and accordingly an aspect of the present invention is concerned with increasing the strength of the seat mounting against such loads.

Accordingly, where the mounting comprises relatively slidable channels, the channels may have interlocking external flanges co-operating with each other and capable of deformation to absorb those loads. Alternatively, one or both slidable channel members can have secured to it an elongate plate or other member carrying flanges or the like for co-operating with parts of the other channel member.

DESCRIPTION OF THE DRAWING

The invention may be carried into practice in various ways and two embodiments will now be described by way of example with reference to the accompanying drawings, of which.

As described in British Patent Specification No. 1295044, outer and inner elongate channels 11 and 12 are arranged for mounting respectively to the underside of the seat and to the floor of a car, and fore-and-aft adjustment of the seat is obtained by relative sliding of the channels on ball bearings 14 in respective opposed corners of the channels. As described in that British Patent Specification, in the case of suddenly applied loads, flanges shown respectively at 15 and 16 and abutments shown at 17 and 18 on the two chanels can come into contact to withstand those loads and prevent the seat being torn away from the floor of the vehicle.

If, however, the occupant is to be strapped into the seat by a seat belt, one end of which is fastened either to the seat or to the outer slide 11, the loads to be withstood can be greater than if the seat belt is secured entirely to the body of the vehicle.

Figure 2:
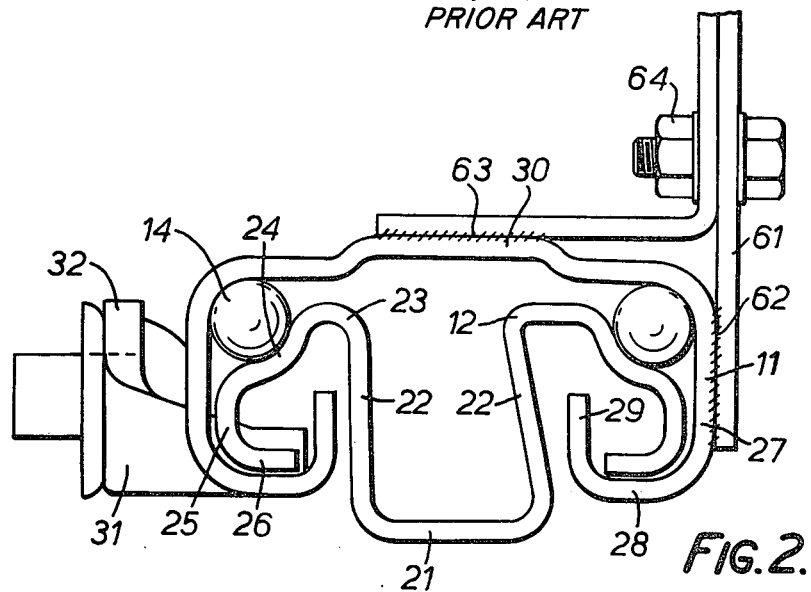
FIG. 2 is a corresponding view of a pair of slides modified in accordance with one embodiment of the present invention.

Accordingly, the arrangement of FIG. 2 has a special form of both channels 11 and 12. The inner channel 12 has a base portion 21 for bolting to the vehicle floor and two upstanding portions 22 which turn outwards at the top at 23 — being concave at 24 to define a race for balls 14 — and then depending downwards at 25 and turning back inwards horizontally at 26. The outer channel 11 has downwardly depending side webs 27 from a horizontal top 30, which define the upper, outer side of the ball races and which turn horizontally inwardly at 28 and then vertically upwardly at 29.

In the event of a vertical upward or downward load from the outer channel 11 to the inner channel 12, there are large metal surfaces of both channels which come into contact and have to be deformed before either channel is distorted sufficiently to enable the seat to be torn away from the floor of the vehicle.

For example, in the case of an upward force from the outer channel 11 as would be experienced at the back of the slides in a head-on collision, the parts 28 and 26 would come into contact and the portion 25 would be compressed, while the portion 26 would be bent upwards. The tensile load would be carried in the vertical portions 22 so that some of the energy would be absorbed in deforming the mating flanges and all the load would be applied to the bolts holding the base 21 to the floor. These bolts can of course be made as strong as is necessary.

In the case of a downward load from the outer slide 11 as would be experienced at the front of the slide in a head-on collision, load is applied through the balls 14 to the portions 24 and 25 of the inner channel to cause bending at 23 and compressive forces in the portions 22. Thus the modification in the design of the channels compared with the design in FIG. 1 enables substantially larger loads to be withstood.

An alternative design of inner channel 12 is shown at the right of the center line in FIG. 2. The portion 22 is not vertical but inclined inwardly and upwardly.

A lock 31 for holding the channels in a relative position of fore-and-aft adjustment and an operating member 32 for the lock can be exactly as described in British Patent Specification No. 1295044. In general, there will be two such pairs of fore-and-aft adjusting channels one at each side of the seat and the operating members for the top pairs can be operated by a common bar extending underneath the front of the seat as described in British Patent Specification No. 1240265.

Figure 4:
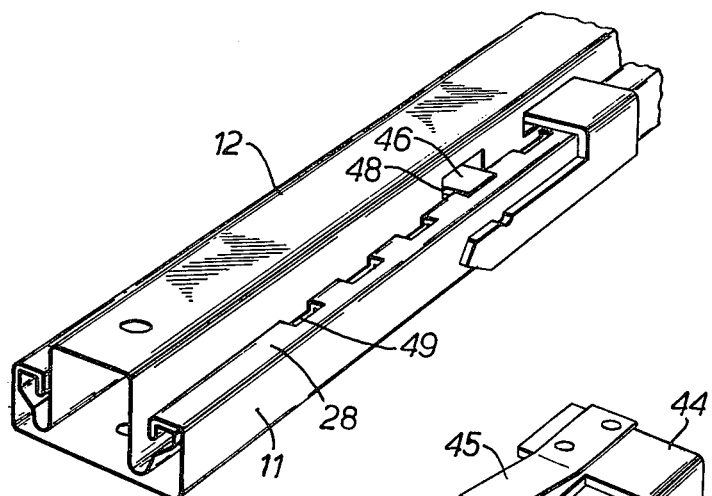
FIGS. 4 and 5 are perspective views of a latching arrangement, and of the latch itself, for holding a selected relative forward position of the slides.
Figure 5:
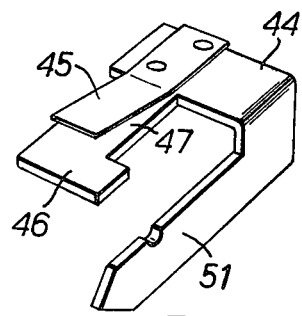

Instead of using the lock 31, the channels 11 and 12 can be locked in a selected relative position of fore-and-aft adjustment by means of the trigger shown at 44 in FIG. 5 which has a leaf spring 45 rivetted to it and which is fastened on the underside of the horizontal wall of the channel 12 to be capable of pivoting about a transverse horizontal axis. The trigger includes a transversely extending detent 46 at the end of a forwardly directed arm 47 and the two ends of the detent 46 project each through one slot 48 in the side wall of the channel 12. The spring normally pivots the trigger horizontally downwards so that the detents 46 engage selected notches 49 in the part 28 of the channel, as shown in FIG. 4, which shows that in that case the inner channel 12 is fixed to the seal, and the outer channel 11 to the floor.

Depending upon the selected fore-and-aft position, if it is desired to move the seat forward, a lever part 51 of the trigger is lifted by use of an operating member similar to that described in British Patent Specification No. 1295044 so that the detent 41 can more clear of the notches 49 and the channel 12 can be slid to a new position in relation to the channel 11, after which the spring 45 urges the detents back into an appropriate notch 49.

Figure 6:
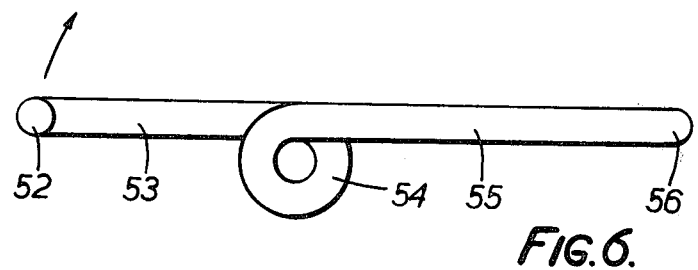
FIGS. 6 and 7 are an elevation and plan respectively of a combined spring and trigger constituting an alternative form of latch for the same purpose.
Figure 7:
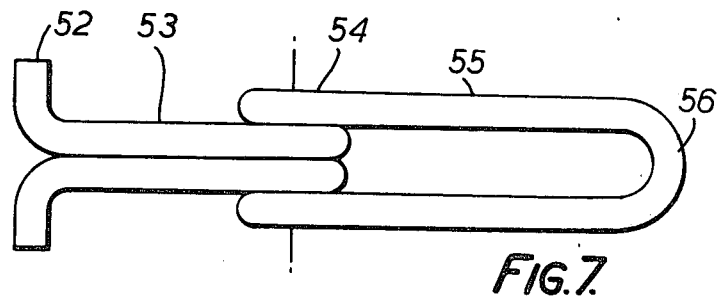

An alternative trigger shown in FIGS. 6 and 7 consists of spring wire bent to have outwardly transversely projecting ends 52, a pair of side-by-side legs 53, turns 54 forming a helical spring and legs 55 leading to a rear arcuate section 56.

The action is similar to that of the trigger spring in FIG. 5 but a separate spring is not necessary because the coils 54 are arranged always to urge the ends 52 into engaging slots in the outer channel 11.

For fore-and-aft adjustment the trigger can be tilted out of engagement with the channel 11 by lowering the arcuate portions 56 with a suitable operating member.

Figure 3:
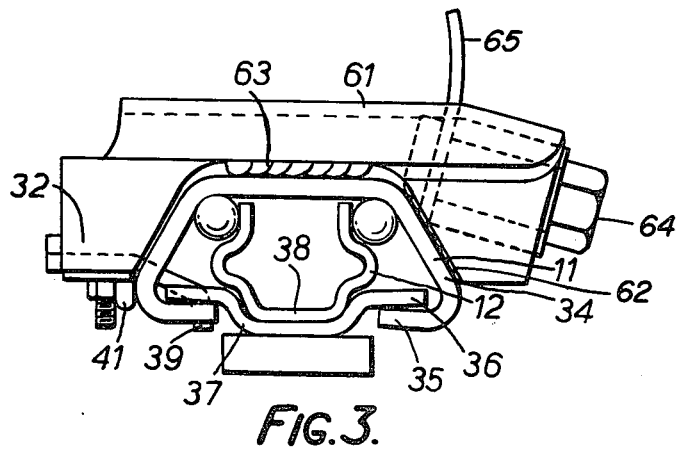
FIG. 3 is a similar view of a second embodiment of the present invention.

FIG. 2 shows a standard seat belt-fixing attachment 61, welded at 62 and 63 to the outer channel 11, which in this case is the channel fixed to the seat, and shows a bolt 64 used for attaching the end of the seat belt (such as 65 as shown in FIG. 3) firmly to the rear end of the channel 11 through the medium of the fixing attachment.

Figure 1:
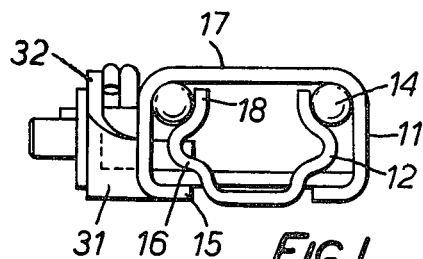
FIG. 1 is an end view of a pair of relatively slidable members as shown in FIG. 4 of prior British Patent Specification No. 1295044 showing a prior art arrangement.

The alternative channel arrangement shown in FIG. 3 has an inner channel 12 which is exactly the same as that shown in FIG. 1, but the outer channel 11 has side portions 34 which extend outwardly and downwardly and then turn inwardly to define horizontal flanges 35 which engage under outwardly extending flanges 36 on a reinforcing plate 37 extending along the length of the base 38 of the channel 12, being bolted with it to the floor of the vehicle. In that case, the upward force from the outer channel 11 is transferred to the floor of the vehicle through the flanges 35 and 36.

In that embodiment, the lock for holding the slides in a set position of fore-and-aft adjustment is rather different in that it comprises a pair of inwardly and downwardly curved fingers 39 extending through slots in one of the webs 34 into selected notches in the flange 36 and then into further notches in the underlying flange 35. The two fingers can be made strong enough to withstand the necessary loads.

As with the arrangement already described, the lock can be released to allow adjustment of the slides by lifting the fingers 39 by operating the member 32 against a spring 41 exactly as described in British Patent Specification No. 1295044.

An alternative belt attachment 61 is shown fixed to the channel 11 at 62 and 63.

What we claim as our invention and desire to secure by Letters Patent is:

1. A mounting for a vehicle seat which comprises two relatively slidable elongated members, one of which is attachable to a vehicle seat and the second of which is attachable to a vehicle floor, each of said two elongate members having a cross-section which includes two arcuate portions, said elongate members being positioned relative to one another such that each arcuate portion of one member is positioned in correspondence with an arcuate portion of the other member to thereby form two separate ball tracks; roller means positioned in each of said ball tracks to provide frictionless slidable movement between said elongate members; each elongate member also including extension flanges extending beyond each of said arcuate portions, said extension flanges of each of said two elongate members cooperating with each other to contact and bend one another in response to loads applied to said elongate member attachable to said vehicle seat; and means on said elongate member attachable to said vehicle seat for connection to one end of a seat belt.

2. A seat mounting as claimed in claim 1, including a seat belt having one end secured to said seat belt attachment means on said member attachable to said vehicle seat.

3. A seat mounting as claimed in claim 1, wherein said elongate member attachable to said vehicle seat has means forming openings therein, wherein said elongate member attachable to said vehicle floor has means forming notches therein, and wherein trigger means are utilized to align said openings with said notches and thereby position said elongate members in position with respect to one another.

4. A seat mounting as claimed in claim 1, wherein said means for attachment of a seat belt to said elongate member attachable to said vehicle seat is positioned at an end thereof.

5. A seat mounting according to claim 4, wherein said two relatively slidable elongate members are in the general shape of fore-and-aft channels.

6. A seat mounting according to claim 1 wherein the extension flanges of said elongate member attachable to the vehicle seat generally encompass the corresponding extension flanges of said elongate member attachable to the vehicle floor.

7. A seat mounting according to claim 1, wherein said roller means are ball bearings.

8. A seat mounting according to claim 1, wherein said elongate member attachable to a vehicle seat includes means for attachment to a vehicle seat, and wherein said elongate member attachable to a vehicle floor includes means for attachment to a vehicle floor.

9. A seat mounting according to claim 1, wherein said elongate member attachable to the vehicle floor comprises, in cross section, a generally flat base portion which is connected to two portions extending in a generally perpendicular direction therefrom, thereby forming a generally U-shaped structure; each said generally perpendicular portion being connected to a portion bent outwardly from said generally U-shaped structure; each said outwardly bent portion being connected to an arcuate portion which forms one side of one of said two ball tracks; each arcuate portion then being connected to a portion extending generally downwardly and in the direction of a plane formed by said generally flat base portion; and each said downwardly extending portion being connected to a portion extending inwardly toward said generally U-shaped structure.

10. A seat mounting according to claim 9, wherein said elongate member attachable to the vehicle seat comprises, in cross section, a generally flat top portion which is connected to two arcuate portions, each arcuate portion forming one side of one of said two ball tracks; each arcuate portion then being connected to a portion which extends in a generally perpendicular fashion to said flat top portion; said generally flat top portion, said arcuate portions and said generally perpendicular portions forming a generally U-shaped structure; each said generally perpendicular portion being connected to a portion extending generally inwardly of said U-shaped structure and generally parallel with said flat top portion; and each said generally inwardly extending portion being connected to a portion which extends in a direction towards said generally flat top portion.

11. A seat mounting according to claim 10, wherein the generally perpendicular portions of the member attachable to the vehicle seat, together with the generally inwardly extending portions and the portions which extend in a direction towards the generally flat top portion thereof encompass the corresponding generally downwardly and generally inwardly extending portions of the elongate member attachable to the vehicle floor.

12. A seat member according to claim 1, wherein said elongate member attachable to the vehicle floor comprises, in cross section, a generally flat base portion which is connected to two portions extending in a generally perpendicular direction therefrom, thereby forming a generally U-shaped structure; each said generally perpendicular portion including an arcuate portion which forms one side of one of said two ball tracks; said generally flat base portion being connected to a reinforcing place which has extending flanges that extend outwardly of said generally U-shaped structure and in a plane generally parallel to the plane of the generally flat base portion.

13. A seat mounting according to claim 12, wherein said elongate member attachable to the vehicle seat comprises, in cross section, a generally flat top portion which is connected to two arcuate portions, each arcuate portion forming one side of one of said two ball tracks; each arcuate portion being connected to a portion which extends away therefrom; said generally flat top portion, said arcuate portions and said portions extending away therefrom forming a generally U-shaped structure; and each said portion extending away from said arcuate portion being connected to a portion which extends inwardly of said generally U-shaped structure.

14. A seat mounting according to claim 13, wherein the portion of the elongate member attachable to the vehicle seat which extends inwardly of said generally U-shaped structure thereof encompasses the extending flanges of the reinforcing plate which forms a part of the elongate member attachable to the vehicle floor.

* * * * *